No. 804,896. PATENTED NOV. 21, 1905.
W. C. STATE.
VEHICLE TIRE AND RIM.
APPLICATION FILED JUNE 26, 1905.

Witnesses:
A. Percy Buchtel.
Glenara Fox.

Inventor
W. C. State.
by C. E. Humphrey,
Atty.

UNITED STATES PATENT OFFICE.

WILL C. STATE, OF AKRON, OHIO, ASSIGNOR TO THE GOODYEAR TIRE & RUBBER COMPANY, OF AKRON, OHIO, A CORPORATION OF OHIO.

VEHICLE TIRE AND RIM.

No. 804,896.　　　Specification of Letters Patent.　　　Patented Nov. 21, 1905.

Application filed June 26, 1905. Serial No. 267,133.

*To all whom it may concern:*

Be it known that I, WILL C. STATE, a citizen of the United States, residing at Akron, in the county of Summit and State of Ohio, have invented new and useful Improvements in Vehicle Tires and Rims, of which the following is a specification.

This invention relates to vehicle-wheels provided with cushion-tires of elastic material, more particularly pneumatic tires of the double-tube type having contractible, inextensible, or semi-inextensible base bands or edges; and the object thereof is to so construct the wheel as to enable the tire to be readily applied or removed from the wheel when necessary.

The invention further aims to provide a wheel of the class referred to with a new and improved retaining means for the tire, hereinafter more specifically described, said means arranged to fixedly secure the tire in position, so that it will not be displaced in any manner, and particularly will retain the tire in position on the wheel-rim and the retaining means in position when the tire is deflated when the wheel on which the tire is mounted is in use.

The invention further aims to provide a vehicle-wheel of the class referred to with a rim more particularly described later, said rim coöperating with new and improved retaining means for the tires, said rim and retaining means being simple in construction, strong, durable, efficient in use, comparatively inexpensive to manufacture, and readily applied to all forms of wheels on which it is possible to seat a tire of this description.

This invention further and particularly aims to provide means for fixedly securing the tire and the means for retaning it in operative relation to the rim and to prevent both the tire and its retaining means from becoming accidentally displaced at any time and to accomplish this by utilizing an auxiliary tire-retaining means for simultaneously retaining the tire on the rim, as well as locking the retaining means against displacement when the tire is deflated.

With the foregoing and other objects in view the invention consists of the novel construction, combination, and arrangement of parts constituting the device to be hereinafter referred to and illustrated in the accompanying drawings, which form a part of this specification, in which is shown the preferred embodiment of the invention; but it is to be understood that changes, variations, and modifications can be resorted to which come within the scope of the claims hereunto appended.

Figure 1:
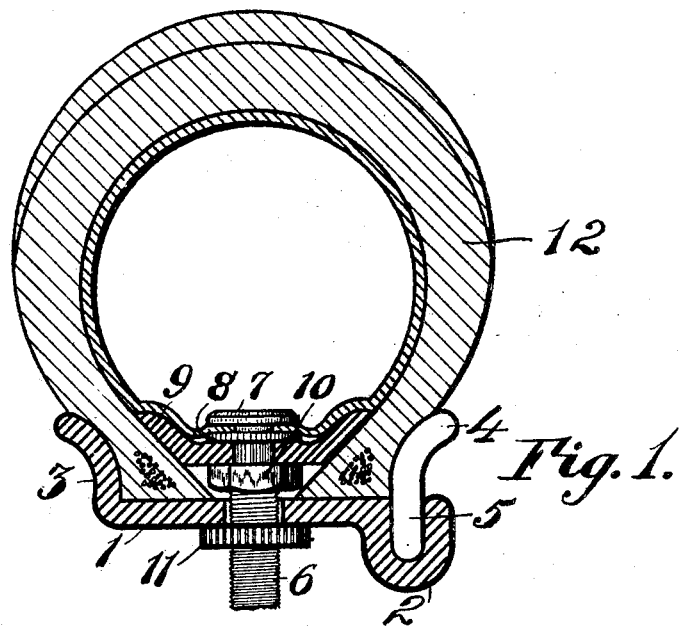
Figure 2:
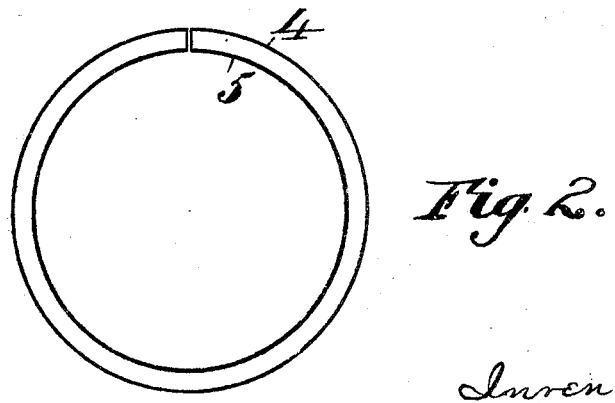

In the drawings, wherein like reference characters denote corresponding parts throughout the several views, Figure 1 is a cross-section of a rim and tire portion of a wheel constructed in accordance with this invention, also showing the retaining means for securing the tire, said retaining means arranged in operative relation with respect to the tire; and Fig. 2 is a side elevation of the retaining means.

Referring to Fig. 1 of the drawings, 1 denotes a flat wheel-rim having one side formed with an endless offset 2 of approximately the shape shown in the drawings in cross-section and forming a seat for a purpose hereinafter set forth. Said offset 2 is preferably below the plane of the face of the rim, and the other side of the rim 1 is formed with an upwardly-extending endless flange 3, forming an abutment and tire-retaining device for a purpose hereinafter set forth, or it may be provided with any other preferred or desired means which will hold or retain that side of the tire which is to seat on the rim securely in place.

The retaining means for the tire, which is indicated in the drawings by the reference-numeral 12, consists of a split ring 4, having its inner portion (indicated by the reference-numeral 5) of approximately the correct shape to fit in the seat formed in the offset 2. The upper outer edge of this ring 4 is curved and is equivalent in contour to the abutment 3. This ring, constituting the retaining means for the tire, is arranged to be sprung into position by passing over the outer portion of the offset 2 and to set in the groove formed therein.

In assembling a wheel for use in connection with the tire shown in Fig. 1 the tire, deflated, is placed upon the rim 1, with one of its edges in operative relation with the abutment 3, and the ring 4 is sprung into the groove in the offset 2, where it will normally retain itself in position by reason of its inherent elasticity and constant tendency to retain itself in a circle. This tendency of the ring is so great that an ordinary amount of pressure against it in any direction will not dislodge it or cause it to leave its seat in the groove in the offset 2; but in order to prevent absolutely any danger of this ring being sprung from its seat while the vehicle-wheel on which it is mounted is in use and the consequent danger of the freeing of the tire from its normal seat on the rim of the wheel the following mechanism is employed: This ring 4 is so made that when it is seated in the groove in the offset 2 the severed ends will approximately abut against one another, and this cut in the ring will be so placed with respect to the tire that it will occur exactly on a transverse line with the point in the tire where the inflation-valve stem is located. This valve-stem, as shown in the drawings, consists of an ordinary threaded tube 6, having on its outer end a head 7 and a loose washer 8, and between these two parts is compressed the inner inflatable tube of the tire.

Below the washer 8 there is placed on the tube 6 a butterfly-shaped clip 9, having downwardly and inwardly converging side faces of such a longitudinal length as experience may find to be best adapted for the purpose to which this clip is to be applied. This clip is held on the tube 6 in proper position by means of a nut 10 engaging the threads on the tube and compressing the clip 9 against the washer 8. This nut 10 is adapted normally to be slightly separated from the outer face of the rim 1, and the tube 6 passes through an opening in the rim 1 of such a size as not to engage the threads thereon.

On the tube 6, inside of the rim 1, is a nut 11, arranged to bear against the under face of the rim when revolved to draw downward the entire mechanism mounted on the tube 6, which has hereinbefore been described.

The operation and function of the clip 9 is to compress the walls of the outer tire or casing against the rounded surfaces of the abutment 3 and split ring 4, and this compressing action of the clip 9 is controlled and maintained by means of the rotatable nut 11.

It will be seen from the description hereinbefore given that the cut in the annularly-shaped ring 4 occurs exactly transversely opposite to the position of the tube 6, and the clip 9, being relatively longitudinally longer than its breadth, will compress the walls of the outer tube or casing of the tire with great force upon the abutting ends of the ring 4, (which has hereinbefore been referred to as the retaining means,) thereby holding it firmly in position without respect to whether or not the tire is deflated and also without respect to whether or not the vehicle on which the tire is used is in motion or not.

It will be obvious that in order to remove the tire it will be only necessary to relax the tension on the clip 9 by loosening the nut 11 sufficiently to release the pressure exerted by the clip on the ring 4, and it can then be sprung from its seat in the offset 2 and the tire afterward drawn sidewise from the rim-face.

What I claim, and desire to secure by Letters Patent, is—

1. A vehicle-wheel comprising a rim and a tire mounted thereon, said rim having an offset along one side thereof forming a seat, an annularly-formed member constituting a tire-retaining means mounted in said seat, means in said tire to compress a wall thereof against said annular member, whereby said annular member is locked in said seat, said compressing means being operable irrespective of the inflation of said tire.

2. A vehicle-wheel comprising a rim and a tire mounted thereon, said rim having an offset along one side thereof forming a seat, an annularly-formed spring member constituting a tire-retaining means mounted in said seat and normally adapted to be retained by its own resiliency therein, means in said tire to compress a wall thereof against said tire-retaining means whereby said retaining means is securely locked in said seat, said compressing means being operable irrespective of the inflation of said tire.

3. A vehicle-wheel comprising a rim and a tire mounted thereon, said rim having an offset along one side thereof forming a seat, a split spring-ring constituting a tire-retaining means mounted in said seat, means in said tire for compressing the wall thereof against said tire-retaining means whereby said retaining means is locked in said seat, said compressing means being operable irrespective of the inflation of said tire.

4. A vehicle-wheel comprising a rim and a tire mounted thereon, said rim having an offset along one side thereof forming a seat, an annularly-formed spring member constituting a tire-retaining means arranged to be sprung into said seat, means carried by said rim and entering said tire to compress a wall thereof against said tire-retaining means whereby said retaining means is locked in said seat, said compressing means being operable irrespective of the inflation of said tire.

5. A vehicle-wheel comprising a rim and a tire mounted thereon, said rim having an offset along one side thereof forming a seat, a split spring member constituting a tire-retaining means arranged to be sprung into said seat, means carried by said rim to inflate said tire, and means operatively engaging said inflating means to compress a wall of said tire against said retaining means whereby said retaining means is locked in said seat, said compressing means being operable irrespective of the inflation of said tire.

6. A vehicle-wheel comprising a rim and a tire mounted thereon, said rim having an offset along one side thereof forming a seat, a split annular member constituting a tire-retaining means arranged to be sprung into said seat, means carried by said rim to inflate said tire, and means operatively engaging said inflating means to compress a wall of said tire against said tire-retaining means whereby said tire-retaining means is locked in said seat, the divided portion of said tire-retaining means being so placed with respect to said compressing means that the pressure exerted by said compressing means will engage said tire approximately at its divided portion, said compressing means being operable irrespective of the inflation of said tire.

7. A vehicle-wheel comprising a rim and a tire mounted thereon, said rim having an offset along one side thereof forming a seat, an annularly-formed split member constituting a tire-retaining means arranged to be sprung into said seat, detachable means carried by said rim to inflate said tire, and means operatively engaging said inflating means to compress a wall of said tire against said tire-retaining means whereby said retaining means is locked in said seat, said compressing means being operable irrespective of the inflation of said tire.

8. A vehicle-wheel comprising a rim and a tire mounted thereon, said rim having an offset along one side thereof forming a seat, a split spring member constituting a tire-retaining means arranged to be sprung into said seat, means carried by said rim and located in said tire to compress a wall thereof against said tire-retaining means at its point of severance whereby said retaining means is locked in said seat, said compressing means being operable irrespective of the inflation of said tire.

9. A vehicle-wheel comprising a rim and a tire mounted thereon, said rim having an offset along one side thereof forming a seat, an annularly-formed split member constituting a tire-retaining means arranged to be sprung into said seat, a valve-stem carried by said rim adapted to inflate said tire, a winged clip operatively connected with said valve-stem to compress a wall of said tire against said tire-retaining means whereby said retaining means is locked in said seat, said clip being operable irrespective of the inflation of said tire.

10. A vehicle-wheel comprising a rim and a tire mounted thereon, said rim having an offset along one side thereof forming a seat, a split annularly-formed member constituting a tire-retaining means arranged to be sprung into said seat, a valve-stem carried by said rim to inflate said tire, a winged clip operatively connected with said valve-stem, means to cause said winged clip to compress a wall of said tire against said tire-retaining means whereby said tire-retaining means is locked in said seat, said clip being operable irrespective of the inflation of said tire.

11. The combination with a wheel-rim and a tire mounted thereon, of a detachable member coöperating with said rim and constituting a tire-retaining means, a valve-stem carried by said rim, and means in operative relation with said valve-stem to compress a wall of said tire against said detachable member whereby said member is locked in place irrespective of the inflation of said tire.

In testimony whereof I have hereunto set my hand in presence of two subscribing witnesses.

WILL C. STATE.

Witnesses:
C. E. HUMPHREY,
GLENARA FOX.